(12) United States Patent
Kobayashi et al.

(10) Patent No.: US 7,379,060 B2
(45) Date of Patent: May 27, 2008

(54) IMAGE PROCESSING METHOD AND IMAGE PROCESSING APPARATUS

(75) Inventors: Toshihiro Kobayashi, Kawasaki (JP); Toshikazu Ohshima, Kyoto (JP)

(73) Assignee: Canon Kabushiki Kaisha, Tokyo (JP)

( * ) Notice: Subject to any disclaimer, the term of this patent is extended or adjusted under 35 U.S.C. 154(b) by 126 days.

(21) Appl. No.: 11/368,591

(22) Filed: Mar. 7, 2006

(65) Prior Publication Data
US 2006/0202985 A1    Sep. 14, 2006

(30) Foreign Application Priority Data
Mar. 9, 2005    (JP)    ............... 2005-066140

(51) Int. Cl.
*G06T 15/00*    (2006.01)
(52) U.S. Cl. .............. 345/419; 345/426; 345/427; 345/582
(58) Field of Classification Search ........ 345/419, 345/426, 582, 427
See application file for complete search history.

(56) References Cited
U.S. PATENT DOCUMENTS

| | | | |
|---|---|---|---|
| 6,850,242 B1 | 2/2005 | Saito | 345/582 |
| 6,972,734 B1 | 12/2005 | Ohshima et al. | 345/8 |
| 7,053,916 B2 | 5/2006 | Kobayashi et al. | 345/633 |
| 2004/0109009 A1 | 6/2004 | Yonezawa et al. | 345/632 |
| 2005/0123171 A1 | 6/2005 | Kobayashi et al. | 382/103 |
| 2006/0044327 A1 | 3/2006 | Okuno et al. | 345/626 |

OTHER PUBLICATIONS

Blinn, J.F., et al., "Texture and Reflection in Computer Generated Images", Communications of the ACM, vol. 19, No. 10, pp. 542-547 (Oct. 1976).
Whitted, T., "An Improved Illumination Model for Shaded Display," Communications of the ACM, vol. 23, No. 6, pp. 343-349 (Jun. 1980).

*Primary Examiner*—Kimbinh T Nguyen
(74) *Attorney, Agent, or Firm*—Fitzpatrick, Cella, Harper & Scinto

(57) ABSTRACT

An image processing method includes a position/orientation acquisition step of acquiring a position and orientation of a viewpoint, a virtual image creation step of creating a virtual image on the basis of the position and orientation of the viewpoint, and a holding step of holding an environment mapping image. In addition, an image extraction step extracts a mapping image area rotated according to a viewpoint rotation component about an axis in a line-of-sight direction from the environment mapping image on the basis of the line-of-sight direction of the viewpoint and the viewpoint rotation component about the axis in the line-of sight direction, and an environment mapping step executes environment mapping processing for the virtual image created in the virtual image creation step by using an image included in the mapping image area extracted in the image extraction step.

12 Claims, 19 Drawing Sheets

FIG. 4

| SURFACE IDENTIFICATION NUMBER | VERTEX DATA IDENTIFICATION NUMBER LIST | TEXTURE IMAGE REFERENCE INFORMATION | TEXTURE COORDINATE LIST | ENVIRONMENT MAPPING FLAG |
|---|---|---|---|---|
| 1 | 1<br>2<br>3 | 690a | $(u_1, v_1)$<br>$(u_2, v_2)$<br>$(u_3, v_3)$ | 1 |
| 2 | 2<br>3<br>4 | | | 0 |
| 3 | 1<br>3<br>4 | | | 0 |
| ⋮ | | | | |

IMAGE A BEFORE ROTATION

IMAGE B AFTER ROTATION

IMAGE C BEFORE ROTATION

IMAGE D AFTER ROTATION

IMAGE PROCESSING METHOD AND IMAGE PROCESSING APPARATUS

FIELD OF THE INVENTION

The present invention relates to a technique of generating an image of a virtual space.

BACKGROUND OF THE INVENTION

There are conventionally proposed information processing apparatuses which generate an image observed from an arbitrary viewpoint in a virtual 3D space by generating an object (article) existing in a virtually set 3D space by using the CG (Computer Graphics) technology, thereby presenting virtual reality. Especially in an information processing apparatus that measures the position/orientation of the user's head and sets it as the observation viewpoint in a virtual 3D space, the image changes as if the apparatus user himself/herself observed the virtual 3D space following the motion of his/her head. For this reason, the user of the apparatus can devote himself/herself to the virtual 3D space.

In order to give the apparatus user a sense closer to the reality, such an apparatus is technically required to realize high-speed image generation processing and improve the quality of a generated image. As a means for solving the problems, a technique called environment mapping is known. Environment mapping is a technique to express reflection of the ambient environment on a virtual object. This technique is disclosed in Blinn, J. F. and Newell, M. E., "Texture and reflection in computer generated images", Communications of the ACM, Vol. 19, No. 10 (October 1976), pp. 542-547.

In environment mapping, an environment mapping image as an image of the ambient environment which should be reflected on a virtual object is prepared in advance. The environment mapping image is mapped as a texture on the virtual object to reflect it. At this time, an area of the environment mapping image which is to be mapped on the virtual object is determined on the basis of a reflection vector calculated from the observation viewpoint of the virtual object and the normal to the vertex of the virtual object. By this method, an expression can be obtained as if the virtual object reflected the ambient environment.

Another example of the method of implementing the same expression by CG is ray tracing. Ray tracing traces a beam striking a virtual object from the viewpoint and obtains the intersection to the beam. This technique is disclosed in, Turner Whitted, "An improved illumination model for shaded display", Communications of the ACM, Vol. 23, No. 6 (June 1980), pp. 343-349.

Environment mapping can execute processing at higher speed than ray tracing and is therefore used especially widely in apparatuses requiring real-time processing for virtual reality presentation or computer games. On the other hand, environment mapping is often poorer than ray tracing in ensuring the accuracy of reflection expression because it substantially aims at simply expressing reflection on a virtual object.

Environment mapping assumes that the position and direction of a viewpoint and the position of a virtual object do not change, and a mapping area in an environment mapping image changes in accordance with rotation of a virtual object. If the position of a virtual object changes, or a virtual object is observed while changing the viewpoint position/orientation, the assumption cannot apply. For this reason, the change of virtual object reflection is unnatural, making the apparatus user feel discomfort.

A system described in U.S. Pat. No. 6,850,242 reduces discomfort by rotating the normal vector of a virtual object. In the conventional method, however, when a virtual object at rest is observed while changing the roll component (the rotation component of the viewpoint about the line of sight) of the viewpoint orientation, reflection on the virtual object changes although it should not change. This phenomenon occurs on the basis of the assumption of environment mapping that the virtual object is rotated while fixing the line-of-sight direction.

An example will be examined in which a reflection object 20 and non-reflection objects 30 are observed from a viewpoint 10, as shown in FIG. 15. An environment mapping image shown in FIG. 16 is mapped on the reflection object 20.

FIG. 17 shows an image obtained by applying environment mapping to the reflection object 20 and observing the reflection object 20 and non-reflection objects 30 from the viewpoint 10 when the roll angle of the viewpoint 10 is 0°. In FIG. 17, a reflection 50 on the object 20 is correctly expressed.

FIG. 18 shows an image obtained by applying environment mapping when the roll angle of the viewpoint 10 is −20°. The reflection 50 must not change with respect to the reflection object 20, as shown in FIG. 19. However, in the conventional environment mapping method, a line-of-sight vector 15 does not change even when the roll angle of the line of sight changes. Hence, texture mapping is executed on the reflection object 20 in the same way as for the roll angle of 0°. That is, the reflection 50 forms the same image as that for the roll angle of 0°, as shown in FIG. 18.

As described above, the image of the reflection object 20 conventionally rotates relatively in a direction reverse to the roll angle (i.e., +20° in FIG. 18), and the reflection cannot be expressed correctly. That is, when the roll angle of the viewpoint 10 is changed, the reflection 50 is observed as if it moved with respect to the reflection object 20 at rest.

When the reflection object 20 and non-reflection objects 30 rotate about the line-of-sight vector 15 without changing the roll angle of the viewpoint 10, the image shown in FIG. 18 is correct, and correct reflection can be expressed by the conventional environment mapping.

SUMMARY OF THE INVENTION

The present invention has been made in consideration of the above-described problems, and has as its object to provide a technique of appropriately expressing reflection of an ambient environment on a virtual object in observing the virtual object while changing the viewpoint orientation.

In order to achieve an object of the present invention, for example, an image processing method of the present invention comprises the following arrangement.

That is, an image processing method comprising:

a position/orientation acquisition step of acquiring a position and orientation of a viewpoint;

a virtual image creation step of creating a virtual image on the basis of the position and orientation of the viewpoint;

a holding step of holding an environment mapping image;

an image extraction step of extracting a mapping image from the environment mapping image on the basis of a line-of-sight direction of the viewpoint and a viewpoint rotation component about an axis in the line-of-sight direction; and an environment mapping step of executing environment mapping processing for the virtual image created in the virtual image creation step by using the mapping image extracted in the image extraction step.

In order to achieve an-object of the present invention, for example, an image processing apparatus of the present invention comprises the following arrangement.

That is, an image processing apparatus comprising:

position/orientation acquisition unit adapted to acquire a position and orientation of a viewpoint;

virtual image creation unit adapted to create a virtual image on the basis of the position and orientation of the viewpoint;

holding unit adapted to hold an environment mapping image;

image extraction unit adapted to extract a mapping image from the environment mapping image on the basis of a line-of-sight direction of the viewpoint and a viewpoint rotation component about an axis in the line-of-sight direction; and environment mapping unit adapted to execute environment mapping processing for the virtual image created by the virtual image creation unit by using the mapping image extracted by the image extraction unit.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 4 is a view showing a structure example of data about each polygon of a virtual object;

DETAILED DESCRIPTION OF THE PREFERRED EMBODIMENTS

Preferred embodiments of the present invention will now be described in detail in accordance with the accompanying drawings.

First Embodiment

<System Configuration>

Figure 1:
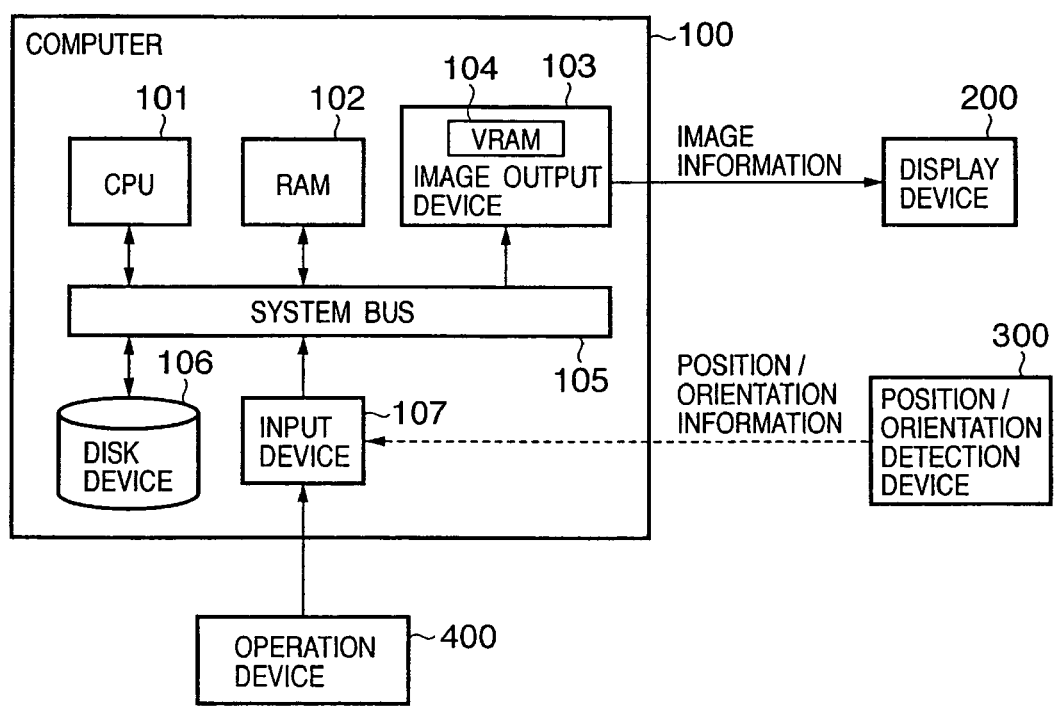
FIG. 1 is a block diagram showing the hardware configuration of a system.

A system for generating and displaying a virtual space image corresponding to the position/orientation of the viewpoint of an observer will be described with reference to FIG. 1 that shows the hardware configuration of the system. As shown in FIG. 1, the system according to the first embodiment comprises a computer 100, display device 200, position/orientation detection device 300, and operation device 400.

The computer 100 will be described. The computer 100 comprises a CPU 101, RAM 102, image output device 103, VRAM 104, system bus 105, disk device 106, and input device 107.

The CPU 101 controls the entire computer 100 by using programs and data loaded to the RAM 102 and executes each processing (to be described later) of the computer 100.

The RAM 102 can provide, as needed, various kinds of areas such as an area to temporarily store programs and data loaded from the disk device 106, an area to temporarily store various data received from an external device through the input device 107, and a work area to be used by the CPU 101 to execute processing.

The image output device 103 is implemented by a device such as a graphics card. In this embodiment, the image output device 103 incorporates the VRAM 104. Upon receiving an instruction from the CPU 101, the image output device 103 executes virtual space image generation processing (CG drawing processing), converts the generated image into an appropriate signal, and sends it to the display device 200. The VRAM 104 functions as a memory to hold data to be used by the image output device 103 to generate a virtual space image, including vertex coordinate value data of each polygon of a virtual object (the virtual object is formed from polygons) arranged in the virtual space, component information of each polygon, and texture data. The VRAM 104 also functions as a memory to temporarily store the data of the generated virtual space image. The VRAM 104 need not always be provided in the image output device 103. The function of the VRAM 104 may be implemented by the RAM 102.

The virtual space image generation processing by the image output device 103 will be described later in detail.

The disk device 106 is a mass storage device represented by a hard disk drive. The disk device 106 stores an OS (Operation System), and programs and data to make the CPU 101 execute each processing (to be described later) of the computer 100. The programs and data are loaded to the RAM 102 or VRAM 104 (partially) under the control of the CPU 101.

The input device 107 functions as an interface to receive, as data, various kinds of signals received from the position/orientation detection device 300 or operation device 400. The received data are sent to the RAM 102.

The system bus 105 connects the above-described components. The above-described components can perform data communication through the system bus 105.

The operation device 400 will be described next. The operation device 400 includes a keyboard or mouse. The operator of the computer 100 can input various kinds of instructions to the CPU 101 by operating the operation device 400.

The display device 200 will be described next. The display device 200 includes a CRT or liquid crystal panel. The display device 200 displays a processing result (image information) by the CPU 101, e.g., a virtual space image generated by the image output device 103 under the control of the CPU 101.

The position/orientation detection device 300 will be described next. The position/orientation detection device 300 includes units to detect the position/orientation of the viewpoint of the observer. The technique of detecting the viewpoint position/orientation will be described later in detail.

<Image Output Device 103>

Figure 2:
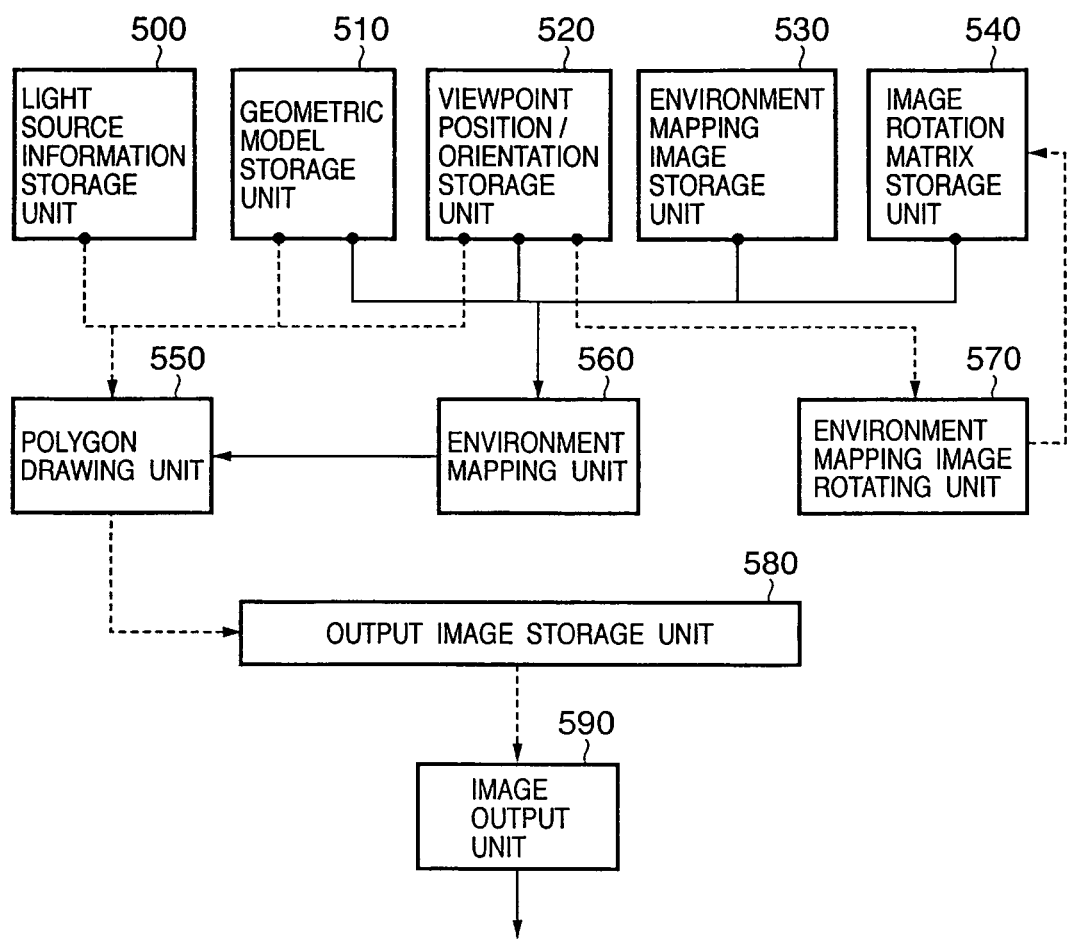
FIG. 2 is a block diagram showing the functional arrangement of an image output device 103.

The image output device 103 will be described next. FIG. 2 is a block diagram showing the functional arrangement of the image output device 103. As described above, the image output device 103 executes processing of generating a virtual space image. More specifically, the image output device 103 generates an image by observing each virtual object in a virtual space from a viewpoint. In this embodiment, a virtual object is formed from polygons. Texture images are mapped on some polygons.

Hence, the image output device 103 has a functional arrangement, i.e., an arrangement shown in FIG. 2 to lay out such virtual objects in a virtual space and generate an image of the virtual space with the virtual objects being laid out viewed from a viewpoint. All "storage units" shown in FIG. 2 are implemented by the VRAM 104 or RAM 102. Various kinds of data (to be described later) stored and held in the "storage units" are loaded from the disk device 106 as needed.

A light source information storage unit 500 stores and holds information about a light source set in the virtual space. The information about the light source contains data necessary for illuminating a virtual object with desired light, including a light source type such as a parallel source or point source, and the color, intensity, and position and direction of the light source.

A geometric model storage unit 510 stores and holds the shape data of a virtual object. The shape data includes data about each polygon of a virtual object and data about each vertex of a polygon.

Figure 3:
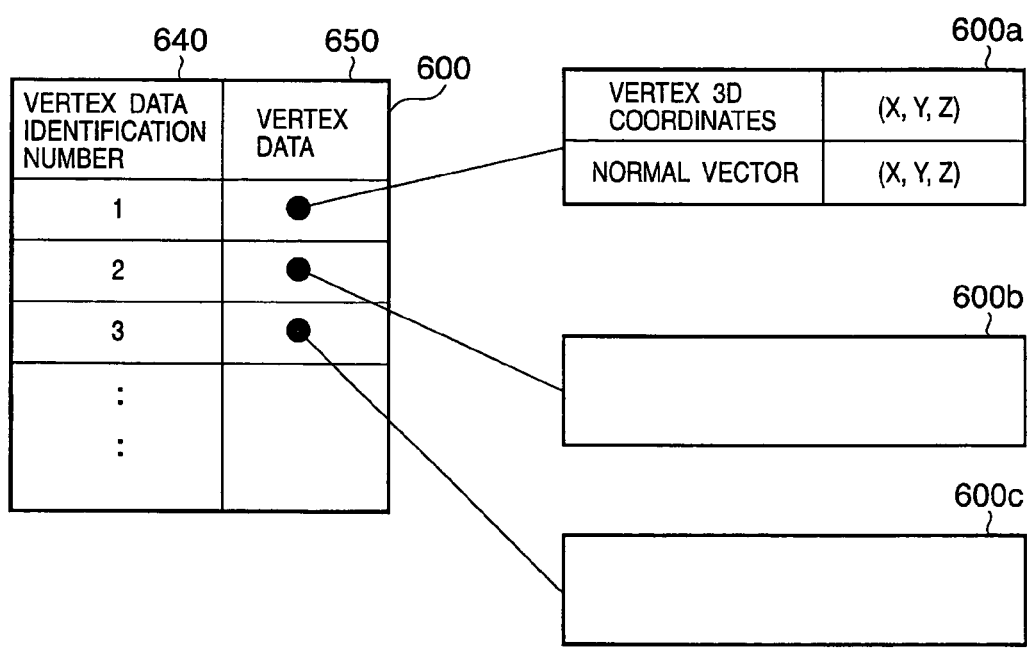
FIG. 3 is a view showing a structure example of data about each vertex of a virtual object.

FIG. 3 is a view showing a structure example of data about each vertex of a virtual object. One table 600 shown in FIG. 3 is present in correspondence with one virtual object. A column 640 registers information (a vertex data identification number in FIG. 3) to identify each vertex of a virtual object. A column 650 registers, for each vertex, a set (600*a*, 600*b*, or 600*c*) of vertex coordinate values (coordinate values in a local coordinate system set for the virtual object in advance) and a normal vector. When one vertex identification number is specified, the coordinate values and normal vector of the vertex can be specified by looking up this table.

FIG. 4 is a view showing a structure example of data about each polygon of a virtual object. One table 660 shown in FIG. 4 is present in correspondence with one virtual object.

A column 670 registers information (a surface identification number in FIG. 4) to identify each polygon of a virtual object.

A column 680 registers the identification number of each vertex of a polygon. For example, a polygon with a surface identification number "1" includes vertices with vertex data identification numbers "1", "2", and "3", as can be specified by referring to the column 680. A polygon with a surface identification number "2" includes vertices with vertex data identification numbers "2", "3", and "4", as can be specified by referring to the column 680.

A column 690 registers information (reference information) to refer to a texture image, such as a pointer to a memory area where a texture image to be used for texture mapping is held or the file name of the texture image. Not all polygons have texture mapping. For such polygons, no information is registered in the column 690. For example, reference information 690*a* is registered for the polygon with the surface identification number "1". Hence, texture mapping using the texture image specified by the reference information 690*a* is executed for this polygon. However, no reference information is registered for the polygon with the surface identification number "2". Hence, no texture mapping is executed for this polygon, as can be specified by referring to the column 690.

A column 710 registers correspondence between each vertex of a polygon to be subjected to texture mapping and a coordinate position on the texture image. Not all polygons have texture mapping. For such polygons, no information is registered in the column 710. For example, the vertices (vertices with the vertex data identification numbers "1", "2", and "3") of the polygon with the surface identification number "1" correspond to points of coordinate values (u1, v1), (u2,v2), and (u3,v3) on the texture image specified by the reference information 690*a*, as can be specified by referring to the column 710.

In this way, information can be obtained, which represents, e.g., that an image in an area defined by the coordinate values (u1,v1), (u2,v2), and (u3,v3) in the texture image specified by the reference information 690*a* is texture-mapped on the polygon with the surface identification number "1".

A column 700 registers a flag "1" for a polygon as an environment mapping target and a flag "0" for a polygon without environment mapping (including texture mapping). In the example shown in FIG. 4, environment mapping is executed for the polygon with the surface identification number "1", as can be specified by referring to the column 700. In this embodiment, an area of a texture image to be used for environment mapping is dynamically changed in accordance with the viewpoint orientation. Hence, an area of a texture image to be mapped on a polygon with the flag "1" is dynamically changed in accordance with the viewpoint orientation. This change will be described later in detail.

The geometric model storage unit 510 also holds information about the feeling of a polygon and information such as a normal texture image to which environment mapping is not applied.

Referring back to FIG. 2, a viewpoint position/orientation storage unit 520 stores and holds the position and orientation of a viewpoint set in the virtual space. In this embodiment, the viewpoint position/orientation storage unit 520 stores a viewpoint position/orientation obtained by the position/orientation detection device 300.

A polygon drawing unit 550 generates a virtual space image viewed from the viewpoint.

An environment mapping image storage unit 530 holds a texture image (environment mapping image) to be used for environment mapping. The environment mapping image is used to add a reflection to a polygon. The environment mapping image must be acquired by sensing the actual ambient environment that is reflected in advance.

Figure 5:
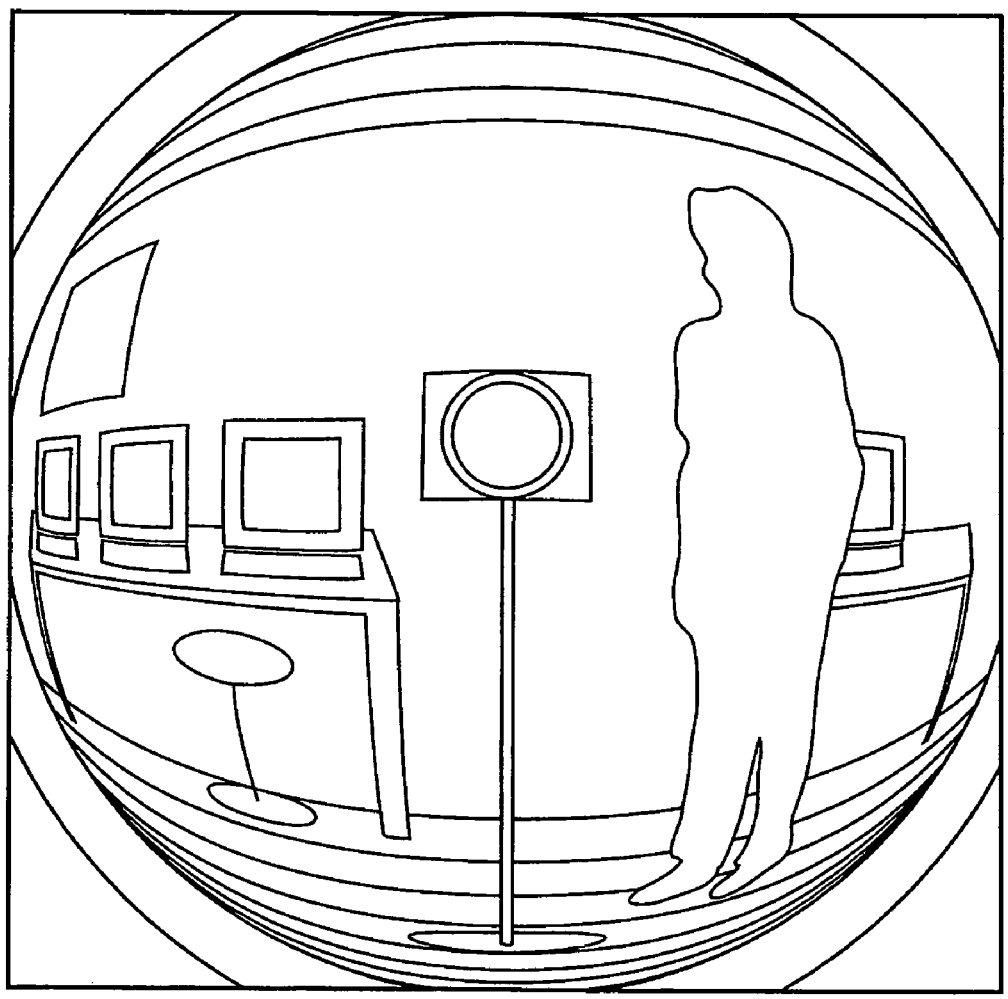
FIG. 5 is a view showing an example of an environment mapping image.
Figure 6:
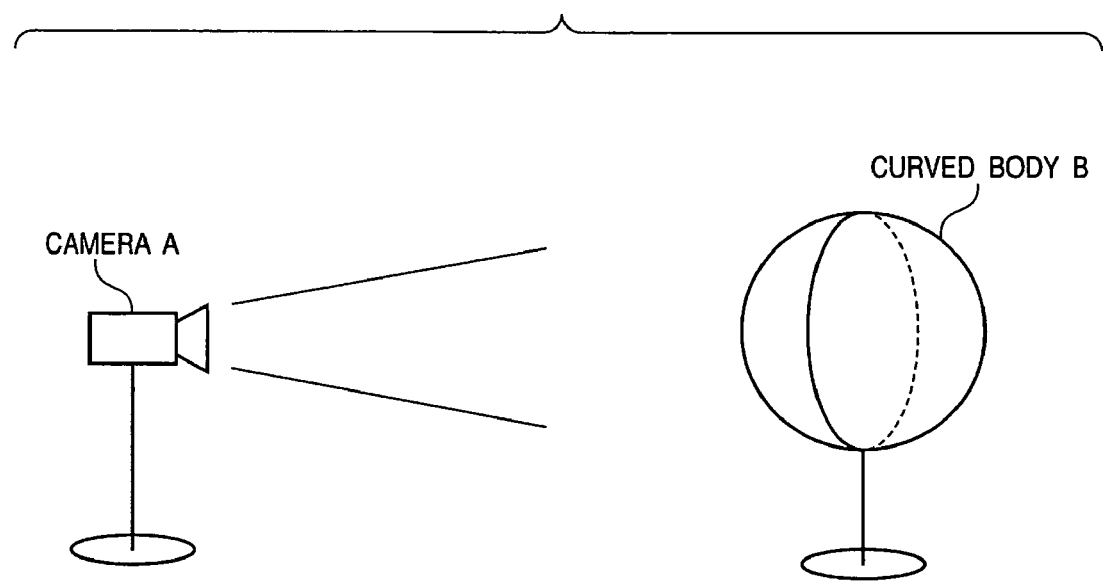
FIG. 6 is a view showing an arrangement to obtain an environment mapping image.

FIG. 5 is a view showing an example of an environment mapping image. A method of acquiring this image will be described with reference to FIG. 6. FIG. 6 is a view showing an arrangement to obtain an environment mapping image.

A curved body B such as a mirror with a high reflectance is laid out in a physical space (physical space where the observer can move) to set a virtual space such that the ambient environment is reflected on the curved body B. Generally, a sphere or hemisphere is used as the curved body B. However, a curved body such as a paraboloidal or hyperboloidal body may be used. An environment mapping image as shown in FIG. 5 is acquired by sensing the curved body B with a camera A.

At this time, it is preferable to make the optical axis of the camera A pass through the center of the curved body B to increase the focal length of the camera A. In this embodiment, the environment mapping image is acquired by sensing the image reflected on the curved body B with the camera A. However, the ambient environment may be sensed directly by attaching a wide field lens such as a fisheye lens to the camera A. In this case, the curved body B is unnecessary. In this embodiment, a real photo image is used as the environment mapping image. However, the present invention is not limited to this. For example, an image obtained by CG may be mapped on a curved body, and the mapped image may be used as the environment mapping image.

An image rotation matrix storage unit 540 stores and holds data of a rotation matrix (to be described later). The rotation matrix is generated by an environment mapping image rotating unit 570 on the basis of a viewpoint orientation. The rotation matrix will be described later.

The polygon drawing unit 550 generates a virtual object by laying out polygons in the virtual space by using data held by the light source information storage unit 500, geometric model storage unit 510, and viewpoint position/orientation storage unit 520. An environment mapping unit 560 maps an area of an environment mapping image (texture image specified by reference information for a polygon in the column 690), which is specified by processing to be described later, on a polygon (polygon having the flag value "1" in the column 700 of the table shown in FIG. 4) of the virtual object set for environment mapping.

The polygon drawing unit 550 generates an image obtained by seeing, from the viewpoint, the virtual space in which the virtual object having a polygon that has undergone environment mapping is laid out. The generated image is output to an output image storage unit 580.

The output image storage unit 580 outputs the received image to an image output unit 590. The image output unit 590 converts the received image into a signal with a format suitable for the display device 200 and outputs the signal to the display device 200.

<Virtual Space Image Generation Processing>

Figure 7:
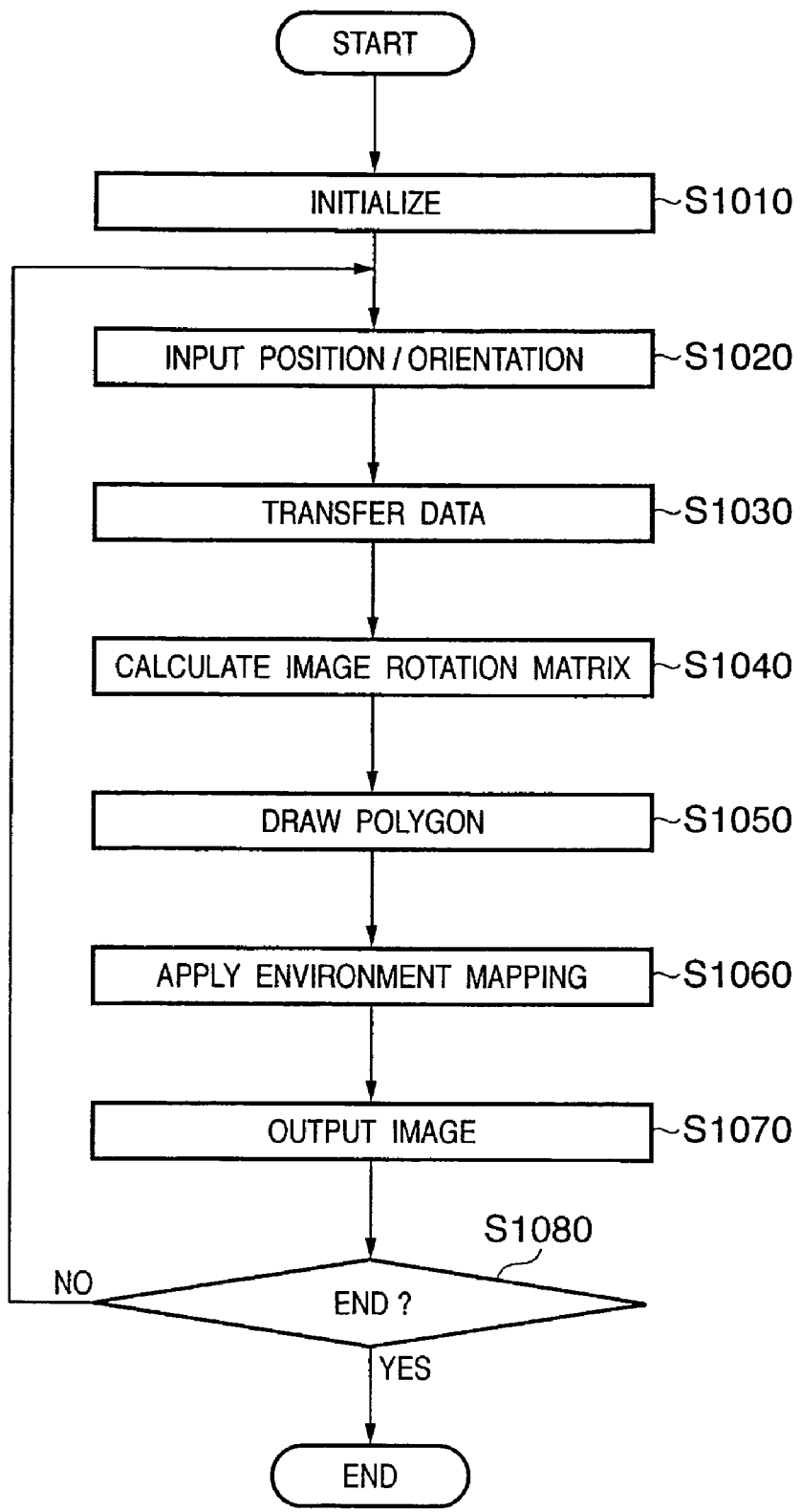
FIG. 7 is a flowchart of a virtual space image generation processing.

Virtual space image generation processing executed by the computer 100 will be described with reference to FIG. 7 that shows the flowchart of the processing. Programs and data to make the CPU 101 execute processing corresponding to the flowchart are saved in the disk device 106. The programs and data are loaded to the RAM 102 under the control of the CPU 101 as needed. The CPU 101 executes the processing by using them so that the computer 100 executes each processing to be described below.

When the computer 100 is activated, various kinds of initialization are executed. The initialization includes processing of loading data held in the storage units shown in FIG. 2 from the disk device 106 to the RAM 102 (Step S1010).

Next, the observer's viewpoint position/orientation is acquired (step S1020). Various methods are available to acquire the observer's viewpoint position/orientation. In this embodiment, for example, the following method is used, although any other method may be used.

The position/orientation detection device 300 includes a magnetic sensor, magnetic source, and position/orientation calculator. The magnetic source is arranged in a predetermined position/orientation in the physical space. The magnetic sensor is attached to the vicinity of the viewpoint (right or left eye) of the observer. The position/orientation calculator controls the magnetic sensor and magnetic source and sends a signal received from the magnetic sensor to the computer 100 as data.

In this arrangement, the magnetic source generates a magnetic field in the physical space. The magnetic sensor detects a change in magnetic field detected in accordance with the position/orientation of its own and sends the detection signal to the position/orientation calculator as a signal. This signal represents the position/orientation of the magnetic sensor in a sensor coordinate system (coordinate system having the origin at the position of the magnetic source and three axes perpendicularly crossing each other at the origin as the x-, y-, and z-axes).

The position/orientation calculator sends the signal to the computer 100 as data. The computer 100 can obtain the position/orientation of the magnetic sensor in the sensor coordinate system. In this case, the position/orientation relationship between the viewpoint and the magnetic sensor is measured in advance. The measurement result is saved as data in the disk device 106 of the computer 100. When this data is added to the "data representing the position/orientation of the magnetic sensor in the sensor coordinate system", the "position/orientation of the viewpoint in the sensor coordinate system" can be obtained as a result.

In addition, the position/orientation relationship between the magnetic source and the world coordinate system (coordinate system having the origin at a predetermined point in the physical space and three axes perpendicularly crossing each other at the origin as the x-, y-, and z-axes) is obtained in advance. When this data is saved in the disk device 106 and added to the "position/orientation of the viewpoint in the sensor coordinate system" obtained precedingly, the "position/orientation of the viewpoint in the world coordinate system" can be obtained. This method of obtaining the viewpoint position/orientation can be applied even when not a magnetic sensor but an optical sensor or ultrasonic sensor is used as the sensor.

Another method is also available. A camera to sense the physical space is attached to the vicinity of the observer's viewpoint. A plurality of markers are arranged in the sensible range of the camera. The position information of each marker in the physical space is saved in the disk device 106 in advance. The viewpoint position of the observer is obtained by using the marker positions in the physical space image sensed by the camera and the marker positions in the physical space.

Alternatively, the observer may hold an identification target such as a marker. The viewpoint position/orientation of the observer may be calculated in the same way as described above by sensing the identification target with a camera installed at another location.

As described above, various methods are available to acquire the viewpoint position/orientation of the observer. Various methods can be applied to this embodiment. The coordinate system to which the obtained position/orientation belongs is determined as needed.

In this embodiment, both the position and orientation of the viewpoint are acquired. In some situations, only the viewpoint orientation changes while the viewpoint position rarely changes. In such a case, only the viewpoint orientation is obtained. As for the viewpoint position, the position data of a fixed viewpoint is saved in the disk device 106. In this case, the viewpoint orientation is obtained by some method in step S1020. For the viewpoint position, the viewpoint position data saved in the disk device 106 is loaded to the RAM 102, thereby acquiring the viewpoint position/orientation in the RAM 102.

Of the data group loaded to the RAM 102, the CPU 101 sequentially transfers the light source data, virtual object shape data, viewpoint position/orientation, data, and environment mapping image to the VRAM 104 of the image output device 103 (step S1030). If no VRAM 104 is provided in the image output device 103, and a partial area of the RAM 102 is used as the VRAM 104, the processing in step S1030 is omitted.

A rotation matrix to be used in the following processing is obtained on the basis of the viewpoint orientation component (step S1040). The rotation matrix and a method of obtaining the same will be described.

Figure 8:
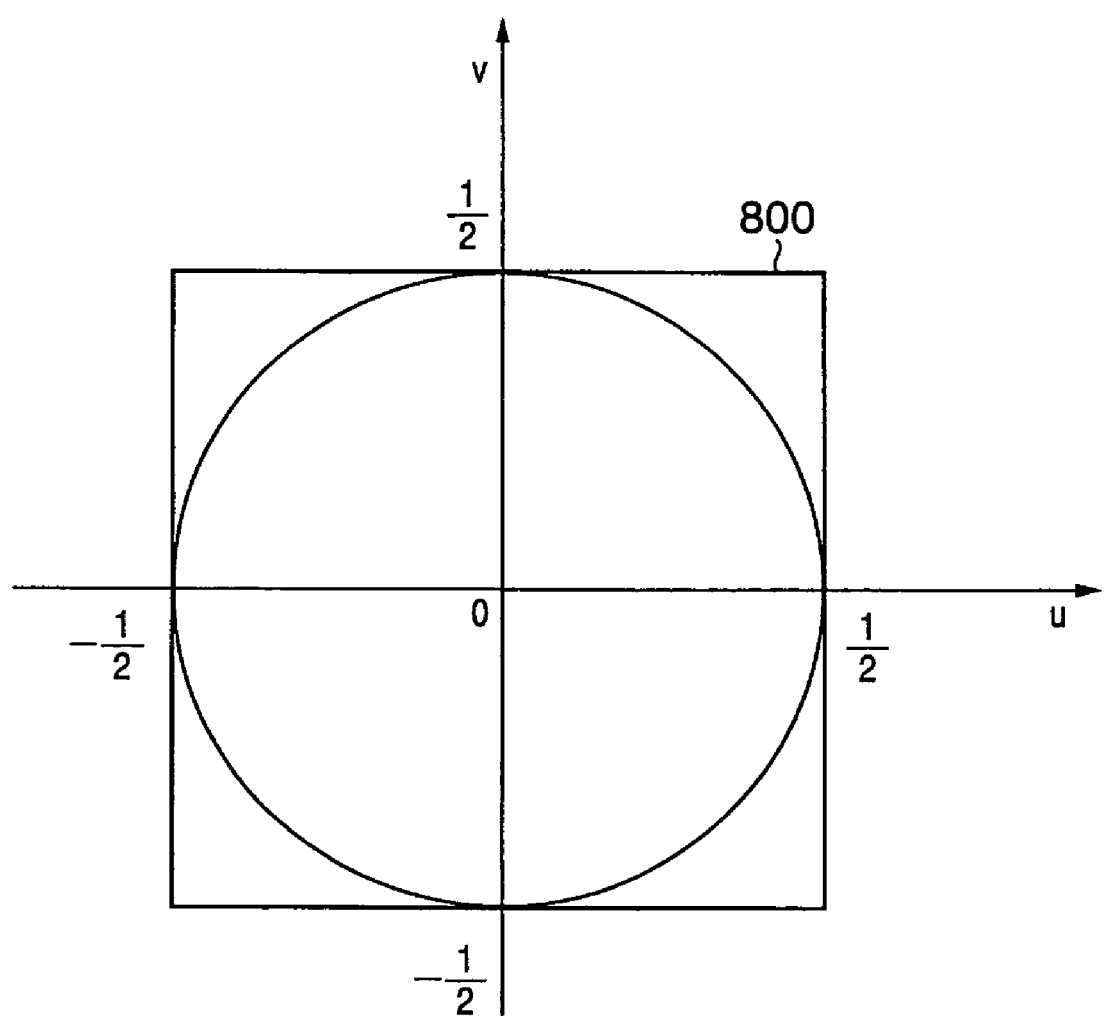
FIG. 8 is a view showing an environment mapping image and a coordinate system provided on it.

FIG. 8 is a view showing an environment mapping image and a coordinate system provided on it. Referring to FIG. 8, reference numeral 800 denotes an environment mapping image. For the following processing, a coordinate system is set in which the central position of the image is defined as an origin O, a horizontal axis passing through the origin is defined as a u-axis, a vertical axis passing through the origin is defined as a v-axis, and the vertical and horizontal sizes of the image are normalized to 1.

As described above, for a polygon to do texture mapping, an area of the texture image to be used for mapping is defined in the column 710. More specifically, if texture mapping is to be done for a polygon having N (N≧3) vertices, an area (basic area) surrounded by N points on the texture image, which correspond to the N vertices, respectively, is texture-mapped on the polygon.

In this embodiment, however, if the texture mapping is environment mapping, the basic area moves on the texture image in accordance with the viewpoint orientation.

To do this, a viewpoint roll angle (rotational angle about an axis set in the viewpoint direction) p is obtained in step S1040. The viewpoint roll angle p can be obtained by using the viewpoint orientation component acquired in step S1020. A rotation matrix R for the roll angle p is obtained by $$R = \begin{vmatrix} \cos(p) & \sin(p) \\ -\sin(p) & \cos(p) \end{vmatrix}$$

The rotation matrix R reduces the roll angle by p.

The obtained rotation matrix data is stored in an area of the RAM 102 or vRAM 104 corresponding to the image rotation matrix storage unit 540.

The CPU 101 controls the image output device 103 to operate the polygon drawing unit 550 so that a virtual object is generated by laying out polygons in the virtual space by using the data held in the light source information storage unit 500, geometric model storage unit 510, and viewpoint position/orientation storage unit 520. More specifically, the polygons are laid out in the virtual space while looking up the table shown in FIG. 4. For example, to lay out the polygon with the surface identification number "1" in the virtual space, the coordinate values of the vertices with the vertex data identification numbers "1", "2", and "3" are acquired from the table in FIG. 3. The vertices are arranged on the acquired coordinate values. With this processing, the polygon with the surface identification number "1" can be laid out in the virtual space. This also applies to the remaining polygons. The processing of laying out virtual objects in the virtual space by laying out polygons in the virtual space is not limited to this.

Next, the CPU 101 controls the image output device 103 to operate the environment mapping unit 560 so that, of the polygons of the virtual object generated in step S1050, each polygon to do environment mapping is specified by using the data held in the geometric model storage unit 510, viewpoint position/orientation storage unit 520, environment mapping image storage unit 530, and image rotation matrix storage unit 540. Environment mapping is executed for the specified polygons (step S1060).

Figure 9:
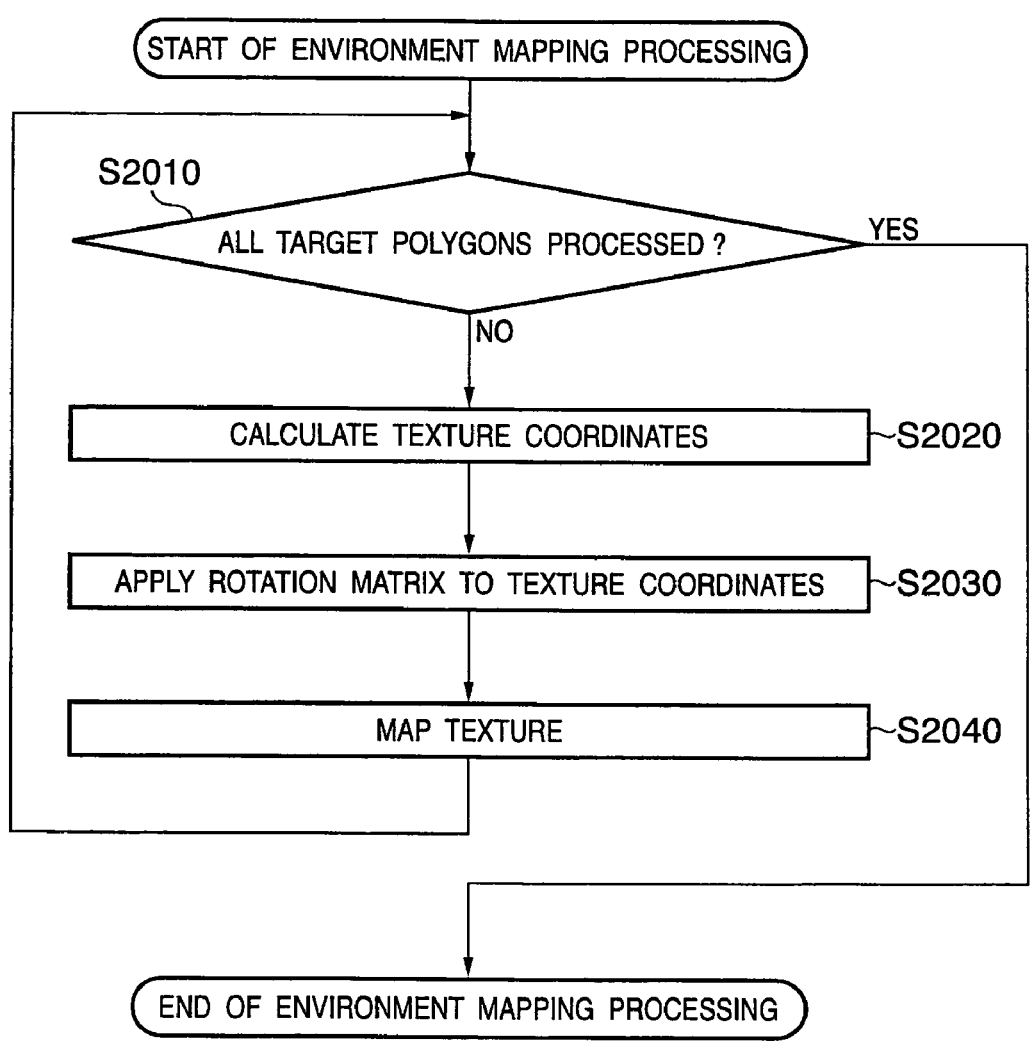
FIG. 9 is a flowchart showing details of processing in step S1060.

Environment mapping processing of this embodiment will be described here in detail with reference to FIG. 9. FIG. 9 is a flowchart showing details of the processing in step S1060.

A polygon with the flag value "1" is searched for by referring to the column 700 of the table in FIG. 4 (step S2010). In FIG. 4, the polygon with the surface identification number "1" is detected. If a polygon with the flag value "1" is found, the processing advances to step S2020. The following description will be done assuming that a polygon with a surface identification number "g" (to be referred to as a polygon g hereinafter) is found by the search in step S2010.

An area of the environment mapping image to be mapped on the polygon g is determined (step S2020). The normal vectors of vertices A1, A2, ..., AN included in the polygon g are obtained. More specifically, the identification numbers of the vertices A1, A2, ..., AN included in the polygon g are specified with reference to the column 680 for the polygon with the identification number "g" in FIG. 4. Normal vectors held in correspondence with the identification numbers of the vertices A1, A2, ..., AN are obtained from the table in FIG. 3.

Corresponding point positions on the environment mapping image for the vertices A1, A2, ..., AN are obtained. Let n be the normal vector (normalized to a unit vector) of the vertex A1, and e be the line-of-sight vector (the line-of-sight vector can be specified uniquely from the viewpoint orientation component and obtained independently of the roll angle). A reflection vector r is obtained by $$r = -2n \times (n \cdot e) + e$$

where (n·e) is the inner product of the vectors e and n. When r=(X,Y,Z), a corresponding point position K1(u1,v1) on the environment mapping image for the vertex A1 can be obtained by $$u1 = X/m$$

$$v1 = Y/m$$

for $m = \sqrt{7}(X^2 + Y^2 + (Z+1)^2)$

This processing is executed for the remaining vertices A2, A3, . . . , AN, too, so that corresponding point positions K1, K2, . . . , KN on the environment mapping image for the vertices A1, A2, . . . , AN can be obtained. The corresponding point positions obtained for the vertices are overwritten in corresponding positions of the column 710 of the list in FIG. 4.

Figure 18:
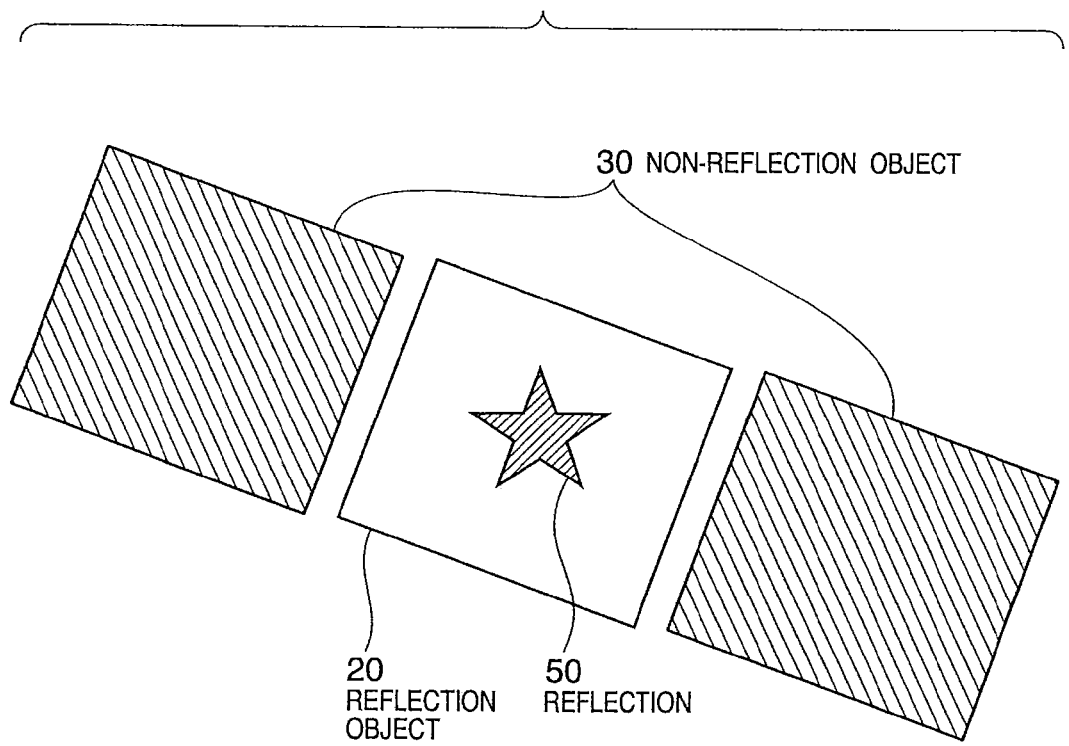
FIG. 18 is a view showing an image obtained by applying environment mapping when the roll angle of the viewpoint 10 is −20°.
Figure 19:
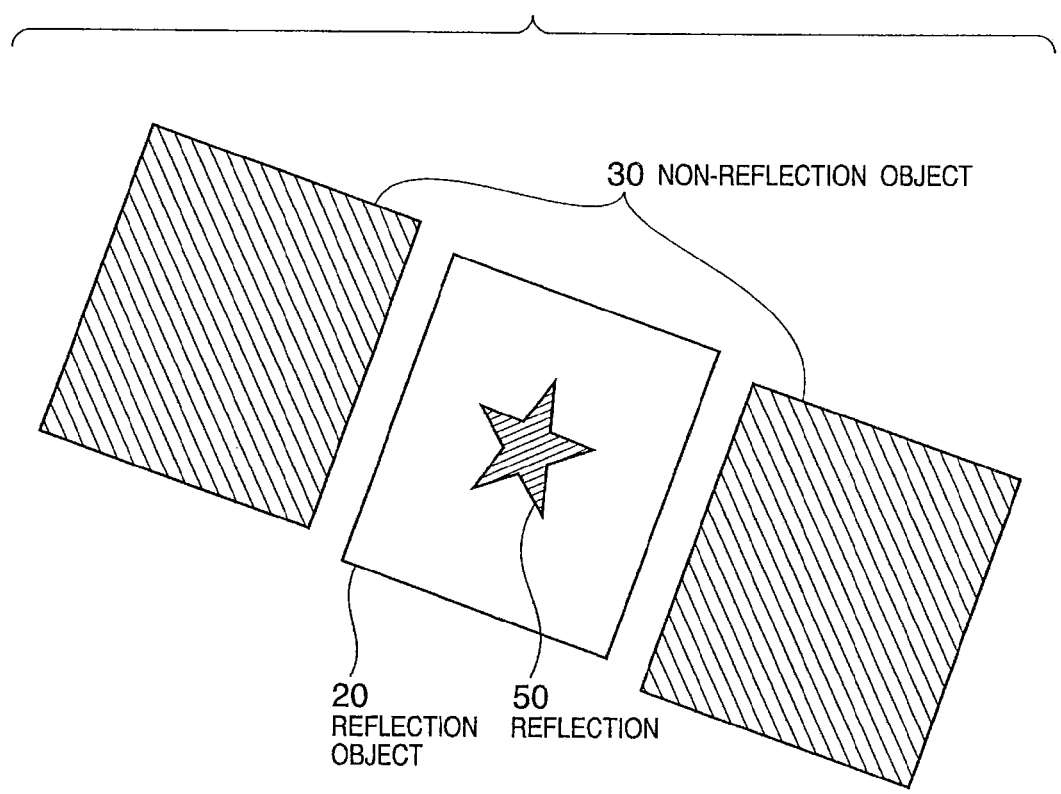
FIG. 19 is a view for explaining a result when a reflection 50 does not change with respect to the reflection object 20.

As described above, the corresponding point positions K1, K2, . . . , KN on the environment mapping image are obtained on the basis of the line-of-sight vector. As described with reference to FIG. 18, when the viewpoint rolls, the object image mismatches with the environment mapping image represented by the corresponding point positions K1, K2, . . . , KN. In this embodiment, the mismatch is solved by executing the following processing for the corresponding point positions K1, K2, . . . , KN.

The obtained corresponding point positions K1, K2, . . . , KN are corrected by using the rotation matrix R, thereby obtaining corresponding point positions K'1, K'2, . . . , K'N rotated about the origin O (step S2030). With the processing in step S2030, the image area of environment mapping can be adjusted in correspondence with the roll angle. That is, the object image and environment mapping image can be made to match on the basis of the roll angle.

The corresponding point positions obtained in step S2030 are overwritten in corresponding positions of the column 710 of the list in FIG. 4.

Hence, to execute environment mapping for the polygon g, an image in the area of the environment mapping image surrounded by K'1, K'2, . . . , K'N is mapped on the polygon g.

With this processing, an area of the environment mapping image to be mapped on the environment mapping target polygon can be specified in accordance with the roll angle of the viewpoint.

Next, an area (in the environment mapping image) surrounded by the corresponding point positions registered in the column 710 corresponding to the polygon g is mapped on the polygon g (step S2040). The environment mapping image can uniquely be specified by referring to the reference information registered in the column 690 corresponding to the polygon g.

The processing is returned to step S2010 and repeated.

Referring back to FIG. 7, the CPU 101 controls the image output device 103 to operate the polygon drawing unit 550 so that an image (virtual space image) is generated by seeing, from the viewpoint, the virtual space in which the virtual object that has undergone environment mapping is laid out. The CPU 101 also controls the image output device 103 to operate the output image storage unit 580 and image output unit 590 so that the generated virtual space image is output to the display device 200 (step S1070).

The processing is ended when the CPU 101 detects the end of processing, e.g., when the CPU 101 detects a processing ending instruction input from the operation device 400 operated by the operator or when the CPU 101 detects that a predetermined ending condition is satisfied. If the end of processing is not detected, the processing is returned to step S1020 through step S1080 and repeated.

As described above, according to this embodiment, when the viewpoint orientation changes, the image to be mapped on the environment mapping target area also changes. As a result, the reflection on the virtual object from the ambient environment can be expressed properly. Hence, the observer can observe a virtual object which has undergone environment mapping without feeling discomfort.

In this embodiment, the actual observer's viewpoint is used as the viewpoint in the virtual space. However, the present invention is not limited to this. A viewpoint whose position/orientation can be changed by operating the operation device 400 as in a TV game may be arranged in the virtual space.

Second Embodiment

In the first embodiment, corresponding point positions on the environment mapping image corresponding to the vertices of the environment mapping target polygon are rotated about the central portion of the environment mapping image by the viewpoint roll angle. An area surrounded by resultant corresponding point positions is specified as an area to be mapped on the environment mapping target polygon. In the second embodiment, a rotated environment mapping image is obtained first by rotating an environment mapping image about its central portion by the viewpoint roll angle. Then, an area surrounded by corresponding point positions on the rotated environment mapping image corresponding to the vertices of an environment mapping target polygon is specified as an area to be mapped on the environment mapping target polygon.

Figure 10:
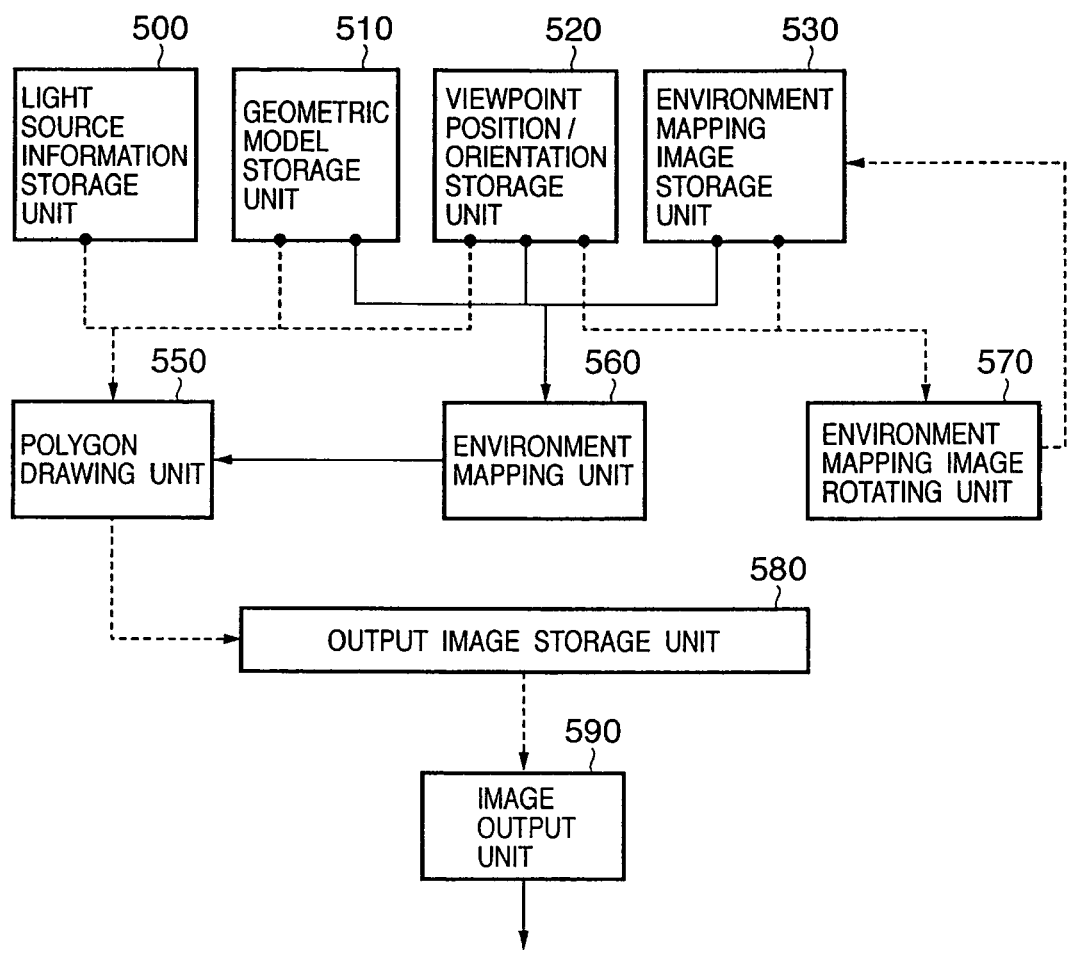
FIG. 10 is a block diagram showing the functional arrangement of an image output device 103 according to the second embodiment of the present invention.

The hardware configuration of the system according to the second embodiment is the same as in the first embodiment except the functional arrangement of an image output device 103. FIG. 10 is a block diagram showing the functional arrangement of the image output device 103 according to this embodiment. The functional arrangement of the image output device 103 according to this embodiment is obtained by omitting the image rotation matrix storage unit 540 from the functional arrangement of the image output device 103 according to the first embodiment.

In this embodiment, an environment mapping image rotating unit 570 generates a rotation matrix in the same way as in the first embodiment. The environment mapping image itself is rotated about an origin O by using the rotation matrix, thereby obtaining the rotated environment mapping image. The environment mapping image stored and held in an environment mapping image storage unit 530 is updated to the rotated environment mapping image. The rotated environment mapping image is used from then as an environment mapping image.

Figure 11:
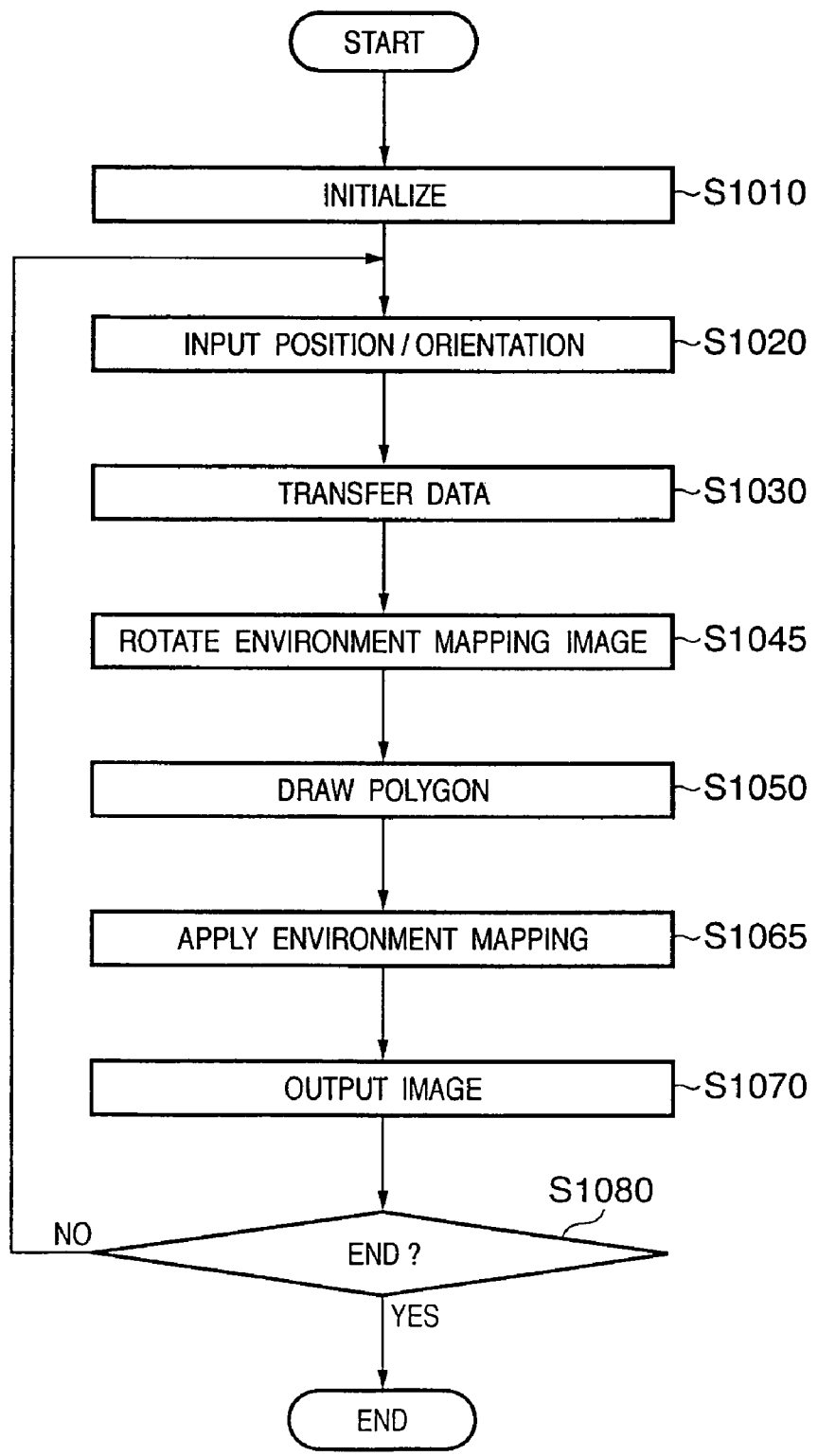
FIG. 11 is a flowchart of virtual space image processing according to the second embodiment of the present invention.

FIG. 11 is a flowchart of virtual space image processing according to this embodiment. The same step number as in FIG. 7 denote the same processing, and a description thereof will be omitted.

In step S1045, a CPU 101 controls the image output device 103 to operate the environment mapping image rotating unit 570 so that a rotation matrix is generated in the same way as in the first embodiment. The environment mapping image is rotated about the origin O by the viewpoint roll angle by using the generated rotation matrix, thereby obtaining the rotated environment mapping image. More specifically, each pixel of the environment mapping image is rotated about the origin O by the viewpoint roll angle to obtain a pixel group as a rotated environment mapping image.

Figure 12A:
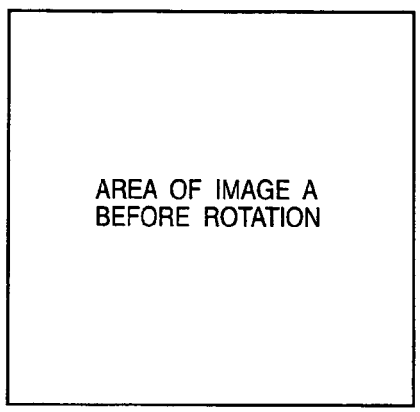
FIG. 12A is a view showing an example of an image (image A) before rotation.
Figure 12B:
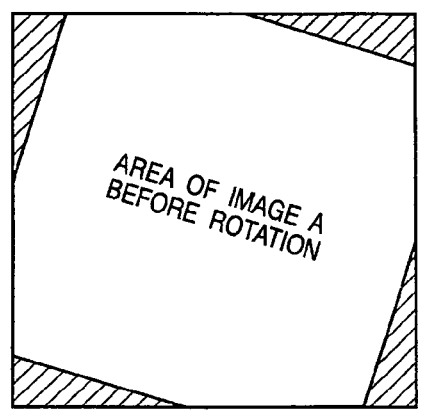
FIG. 12B is a view showing an example of an image (image B) obtained by rotating the image A shown in FIG. 12A.

When an image is rotated, generally, the rotated image suffers a loss. FIG. 12A is a view showing an example of an image (image A) before rotation. FIG. 12B is a view showing an example of an image (image B) obtained by rotating the image A shown in FIG. 12A. The hatched portions of the image B are not present in the original image A. In addition, the corner portions of the original image A are lost in the image B. Generally, when an image is rotated, the information of the original image is partially lost, as described above.

Figure 13A:
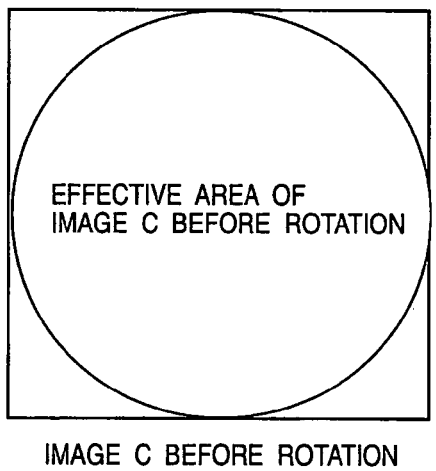
FIG. 13A is a view showing an example of an environment mapping image (image C) before rotation.
Figure 13B:
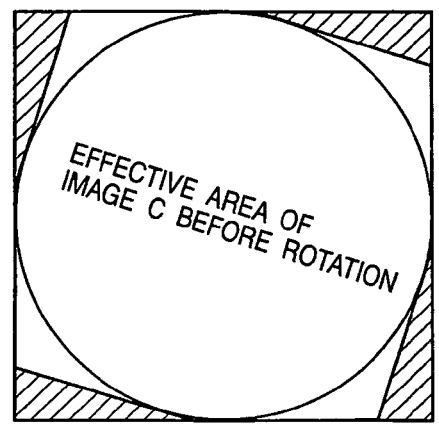
FIG. 13B is a view showing an example of an environment mapping image (image D) obtained by rotating the image C shown in FIG. 13A.

In environment mapping, however, only the internal area of a circle of the environment mapping image is used for mapping. FIG. 13A is a view showing an example of an environment mapping image (image C) before rotation. FIG. 13B is a view showing an example of an environment mapping image (image D) obtained by rotating the image C shown in FIG. 13A. As shown in FIG. 13B, in the image D, the information of the image before rotation is partially lost, as in the image B. However, the internal area ("effective area" in FIGS. 13A and 13B) of the circle to be actually used suffers no loss as compared to the image before rotation. Hence, even when the environment mapping image is rotated, the information of the portion to be used is not lost.

In step S1065, the CPU 101 controls the image output device 103 to operate the environment mapping unit 560 so that environment mapping is executed by using data held in a geometric model storage unit 510, viewpoint position/orientation storage unit 520, and environment mapping image storage unit 530.

Figure 14:
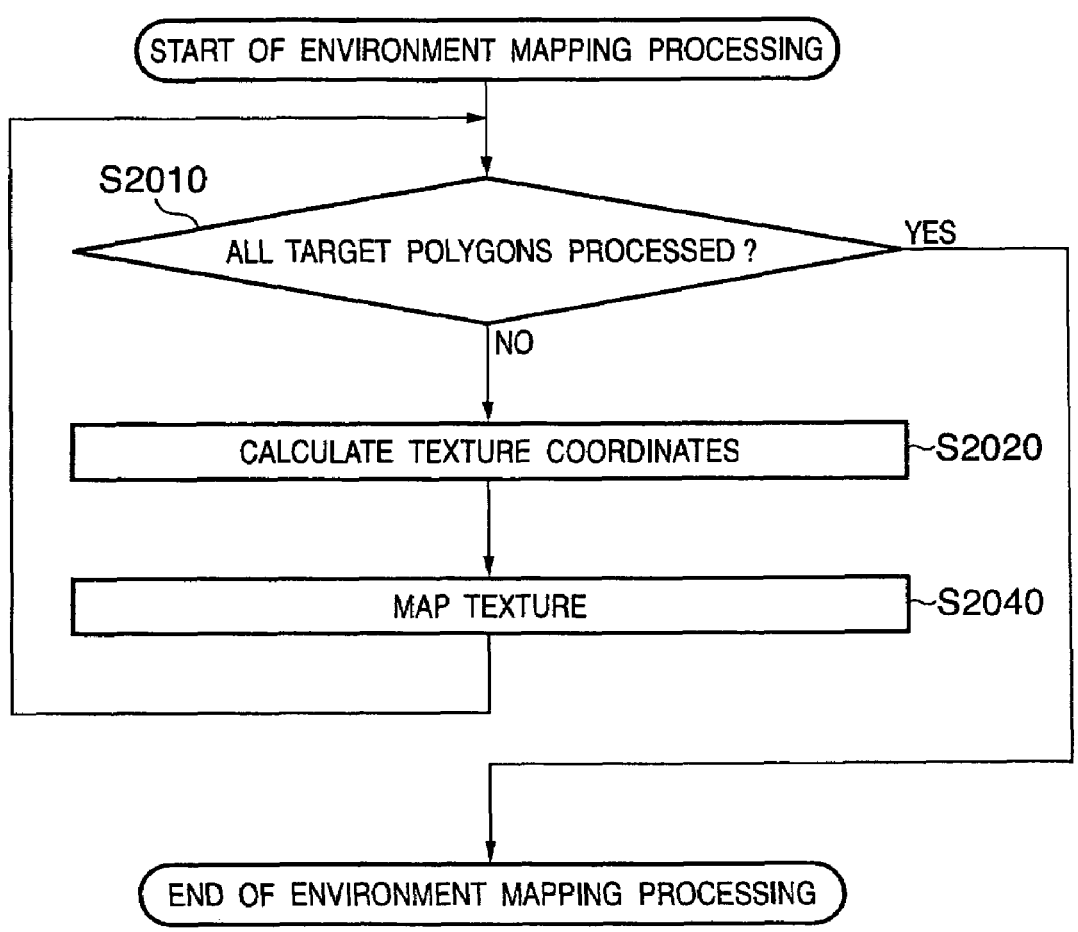
FIG. 14 is a flowchart of processing in step S1065.
Figure 15:
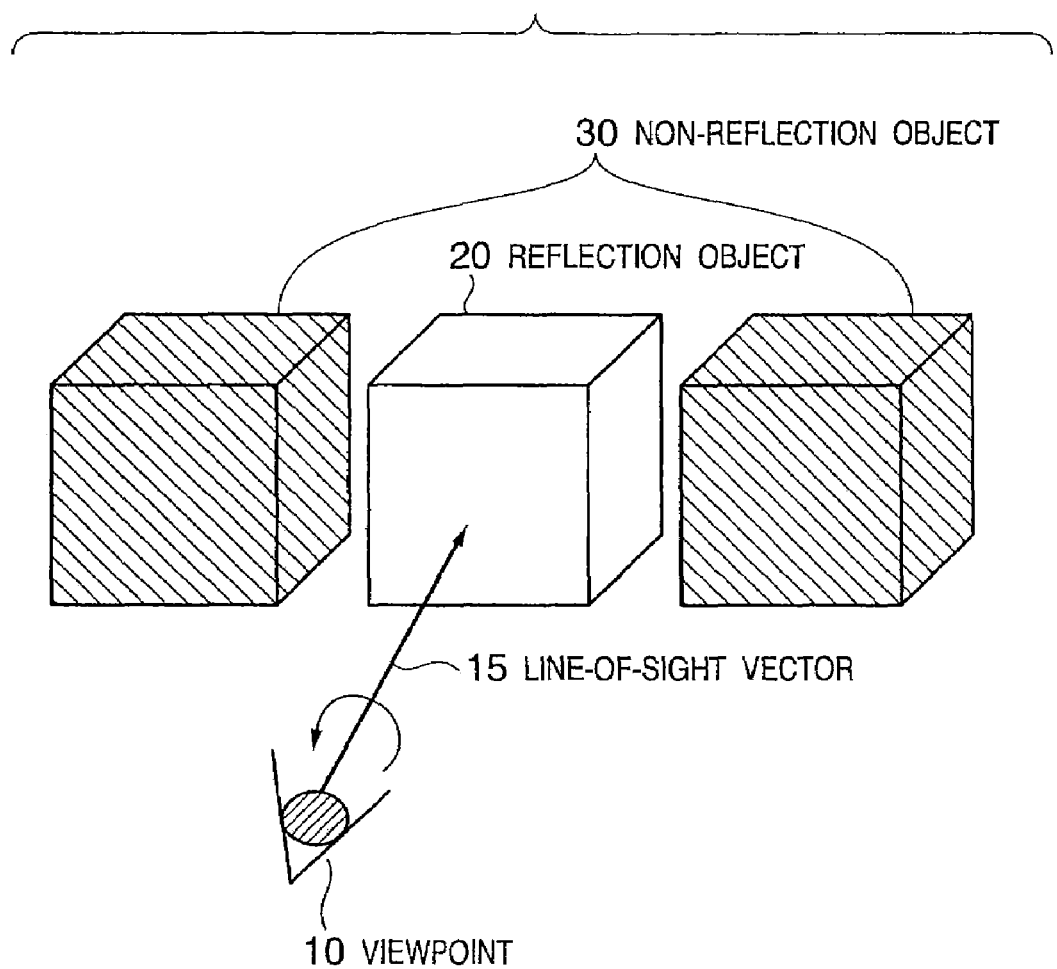
FIG. 15 is a view for explaining observation of a reflection object 20 and non-reflection objects 30 from a viewpoint 10.
Figure 16:
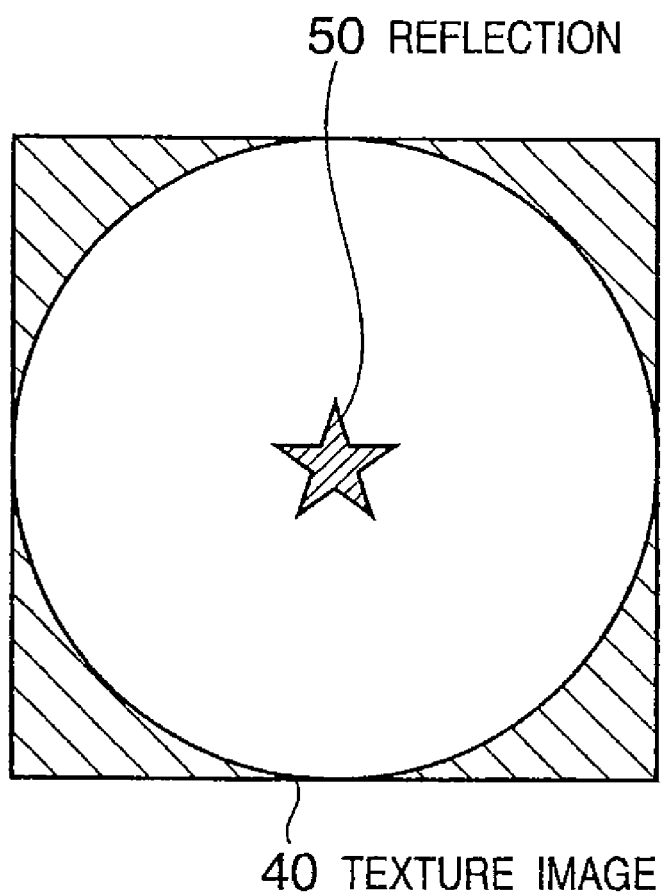
FIG. 16 is a view showing an example of an environment mapping image.
Figure 17:
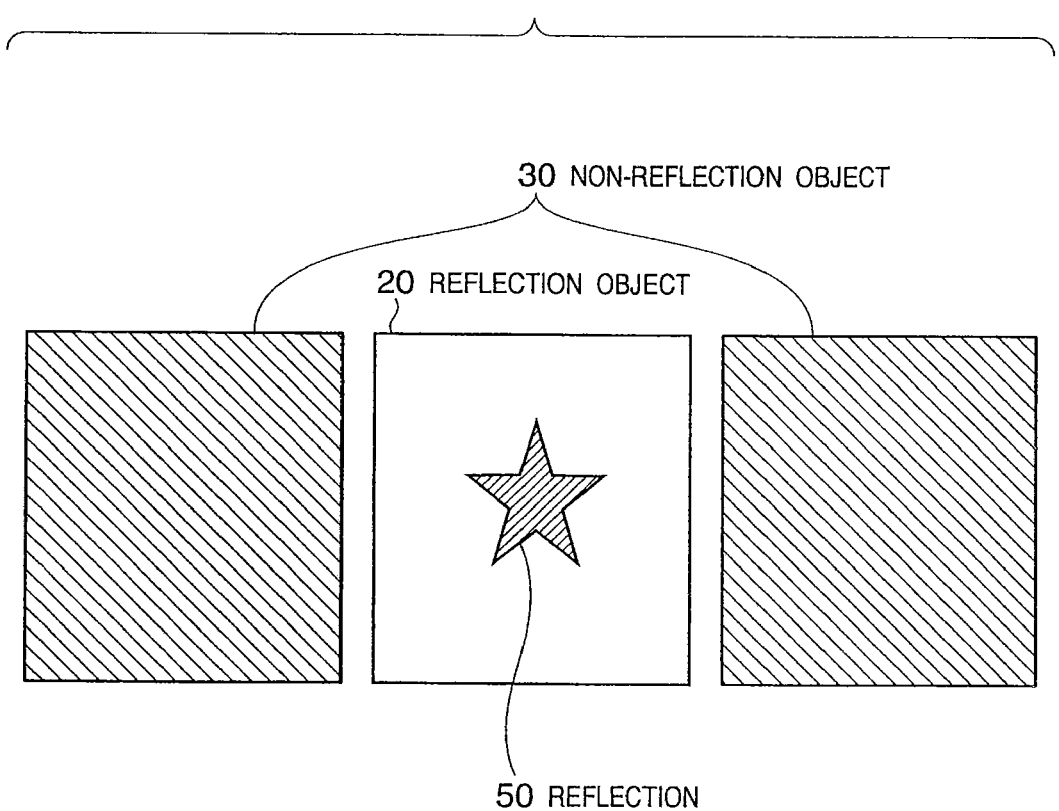
FIG. 17 is a view showing an example of an image obtained by observing the reflection object 20 and non-reflection objects 30 from the viewpoint 10.

FIG. 14 is a flowchart of the processing in step S1065. In the flowchart in FIG. 14, step S2030 is omitted from the flowchart in FIG. 9. That is, processing in steps S2020 and S2040 is executed for the environment mapping target polygon. More specifically, an area of the rotated environment mapping image to be mapped on the environment mapping target polygon is determined (step S2020). The determined area is mapped on the environment mapping target polygon (step S2040). In step S2020 and S2040 of the first embodiment, an environment mapping image is used. In step S2020 and S2040 of the second embodiment, however, a rotated environment mapping image is used.

Third Embodiment

In the above-described embodiments, the virtual space image is displayed on the display device 200. However, the observer may wear an HMD (Head Mounted Display) on the head, and a virtual space image generated by a computer 100 may be generated on the display screen of the HMD. In this case, the HMD may have the above-described magnetic sensor or camera to measure the observer's viewpoint position/orientation.

Other Embodiment

The object of the present invention is achieved even by supplying a recording medium (or storage medium) which records software program codes for implementing the functions of the above-described embodiments to a system or apparatus and causing the computer (or CPU or MPU) of the system or apparatus to read out and execute the program codes stored in the recording medium. In this case, the program codes read out from the recording medium implement the functions of the above-described embodiments by themselves, and the recording medium which records the program codes constitutes the present invention.

The functions of the above-described embodiments are implemented not only when the readout program codes are executed by the computer but also when the operating system (OS) running on the computer performs part or all of actual processing on the basis of the instructions of the program codes.

The functions of the above-described embodiments are also implemented when the program codes read out from the recording medium are written in the memory of a function expansion card inserted into the computer or a function expansion unit connected to the computer, and the CPU of the function expansion card or function expansion unit performs part or all of actual processing on the basis of the instructions of the program codes.

When the present invention is applied to the recording medium, it stores program codes corresponding to the above-described flowcharts.

As many apparently widely different embodiments of the present invention can be made without departing from the spirit and scope thereof, it is to be understood that the invention is not limited to the specific embodiments thereof except as defined in the appended claims.

This application claims the benefit of Japanese Application No. 2005-066140, filed Mar. 9, 2005, which is hereby incorporated by reference herein in its entirety.

What is claimed is:

1. An image processing method comprising:
   a position/orientation acquisition step of acquiring a position and orientation of a viewpoint;
   a virtual image creation step of creating a virtual image on the basis of the position and orientation of the viewpoint;
   a holding step of holding an environment mapping image;
   an image extraction step of extracting a mapping image area rotated according to a viewpoint rotation component about an axis in a line-of-sight direction from the environment mapping image on the basis of the line-of-sight direction of the viewpoint and the viewpoint rotation component about the axis in the line-of-sight direction; and
   an environment mapping step of executing environment mapping processing for the virtual image created in the virtual image creation step by using an image included in the mapping image area extracted in the image extraction step.

2. The method according to claim 1, wherein the image extraction step comprises:
   a setting step of setting an area in the environment mapping image on the basis of the line-of-sight direction; and
   a correction step of correcting the set area, by rotating the set area on the basis of the rotation component, wherein an image included in the corrected area is extracted from the environment mapping image.

3. The method according to claim 2, wherein in the setting step, the area in the environment mapping image is set by using a normal vector of a vertex of a polygon in the virtual image and a line-of-sight vector indicating the line-of-sight direction.

4. The method according to claim 2, wherein in the correction step, the set area is rotated about an origin set at a central portion of the environment mapping image on the basis of the rotation component.

5. The method according to claim 1, wherein the image extraction step comprises:
   a correction step of correcting the environment mapping image, by rotating the environment mapping means on the basis of the rotation component;
   a setting step of setting an area in the environment mapping image from the corrected environment mapping image on the basis of the line-of-sight direction, wherein
   an image included in the set area is extracted.

6. The method according to claim 5, wherein in the setting step, the area in the environment mapping image is set from the corrected environment mapping image by using a normal vector of a vertex of a polygon in the virtual image and a line-of-sight vector indicating the line-of sight direction.

7. The method according to claim 5, wherein in the correction step, the environment mapping image is rotated about an origin set at a central portion of the environment mapping image on the basis of the rotation component.

8. The method according to claim 5, wherein in the correction step, an image in an effective area of the environment mapping image is rotated about an origin set at a central portion of the environment mapping image on the basis of the rotation component.

9. The method according to claim 1, wherein the image extraction step comprises:
   a first step of obtaining a reflection vector r from $r=-2n\times(n\cdot e)+e$ where n is a normal vector of a vertex included in an area in the virtual image to be subjected to environment mapping, and e is a line-of sight vector;
   a second step of obtaining a corresponding point position u, v on the environment mapping image corresponding to the vertex from $u=X/m$, $v=Y/m$, and $m=\sqrt{(X^2+Y^2+(Z+1)^2)}$ when the reflection vector is $r=(X,Y,Z)$; and
   a third step of obtaining a position u', v' obtained by rotating, by the rotation component, the corresponding point position u, v about an origin set at a central portion of the environment mapping image, wherein
   an image included in the mapping image area is extracted from an area surrounded by corresponding points on the environment mapping image, which correspond to vertices of the area of the virtual image and are obtained by executing the first step, the second step, and the third step for the vertices.

10. The method according to claim 1, wherein the image extraction step comprises:
    a first step of obtaining a rotated environment mapping image by rotating, by the rotation component, the environment mapping image about an origin set at a central portion of the environment mapping image;
    a second step of obtaining a reflection vector r from $r=-2n\times(n\cdot e)+e$, where n is a normal vector of a vertex included in an area of the virtual image to be subjected to environment mapping, and e is a line-of sight vector; and
    a third step of obtaining a corresponding point position u, v on the rotated environment mapping image corresponding to the vertex from $u=X/m$, $v=Y/m$, and $m=\sqrt{(X^2+Y^2+(Z+1)^2)}$ when the reflection vector is $r=(X,Y,Z)$, wherein
    an image included in the mapping image area is extracted from an area of the rotated environment mapping image surrounded by the corresponding points which correspond to vertices of the area of the virtual image to be subjected to environment mapping and are obtained by executing the second step and the third step for the vertices.

11. An image processing apparatus comprising:
    a position/orientation acquisition unit adapted to acquire a position and orientation of a viewpoint;
    a virtual image creation unit adapted to create a virtual image on the basis of the position and orientation of the viewpoint;
    a holding unit adapted to hold an environment mapping image;
    an image extraction unit adapted to extract a mapping image area rotated according to a viewpoint rotation component about an axis in a line-of-sight direction from the environment mapping image on the basis of line-of-sight direction of the viewpoint and the viewpoint rotation component about the axis in the line-of-sight direction; and
    an environment mapping unit adapted to execute environment mapping processing for the virtual image created by said virtual image creation unit by using an image included in the mapping image area extracted by said image extraction unit.

12. A computer-readable storage medium storing a program to execute an image processing method comprising:
    a position/orientation acquisition step of acquiring a position and orientation of a viewpoint;
    a virtual image creation step of creating a virtual image on the basis of the position and orientation of the viewpoint;
    a holding step of holding an environment mapping image;
    an image extraction step of extracting a mapping image area rotated according to a viewpoint rotation component about an axis in a line-of-sight direction from the environment mapping image on the basis of the line-of-sight direction of the viewpoint and the viewpoint rotation component about the axis in the line-of sight direction; and
    an environment mapping step of executing environment mapping processing for the virtual image created in the virtual image creation step by using an image included in the mapping image area extracted in the image extraction step.

* * * * *

UNITED STATES PATENT AND TRADEMARK OFFICE
CERTIFICATE OF CORRECTION

PATENT NO.         : 7,379,060 B2                                    Page 1 of 1
APPLICATION NO.    : 11/368591
DATED              : May 27, 2008
INVENTOR(S)        : Toshihiro Kobayashi et al.

It is certified that error appears in the above-identified patent and that said Letters Patent is hereby corrected as shown below:

TITLE PAGE, ITEM [57] ABSTRACT:

Line 13, "line-of" should read --line-of- --.

COLUMN 3:

Line 5, "an-object" should read --an object--.

COLUMN 14:

Line 45, "line-of" should read --line-of- --.

COLUMN 15:

Line 9, "component;" should read --component; and--.
Line 34, "line-of sight" should read --line-of-sight--.

COLUMN 16:

Line 2, "line-of sight" should read --line-of-sight--.
Line 49, "line-of sight" should read --line-of-sight--.

Signed and Sealed this

Twenty-fourth Day of March, 2009

JOHN DOLL
*Acting Director of the United States Patent and Trademark Office*